2,827,505

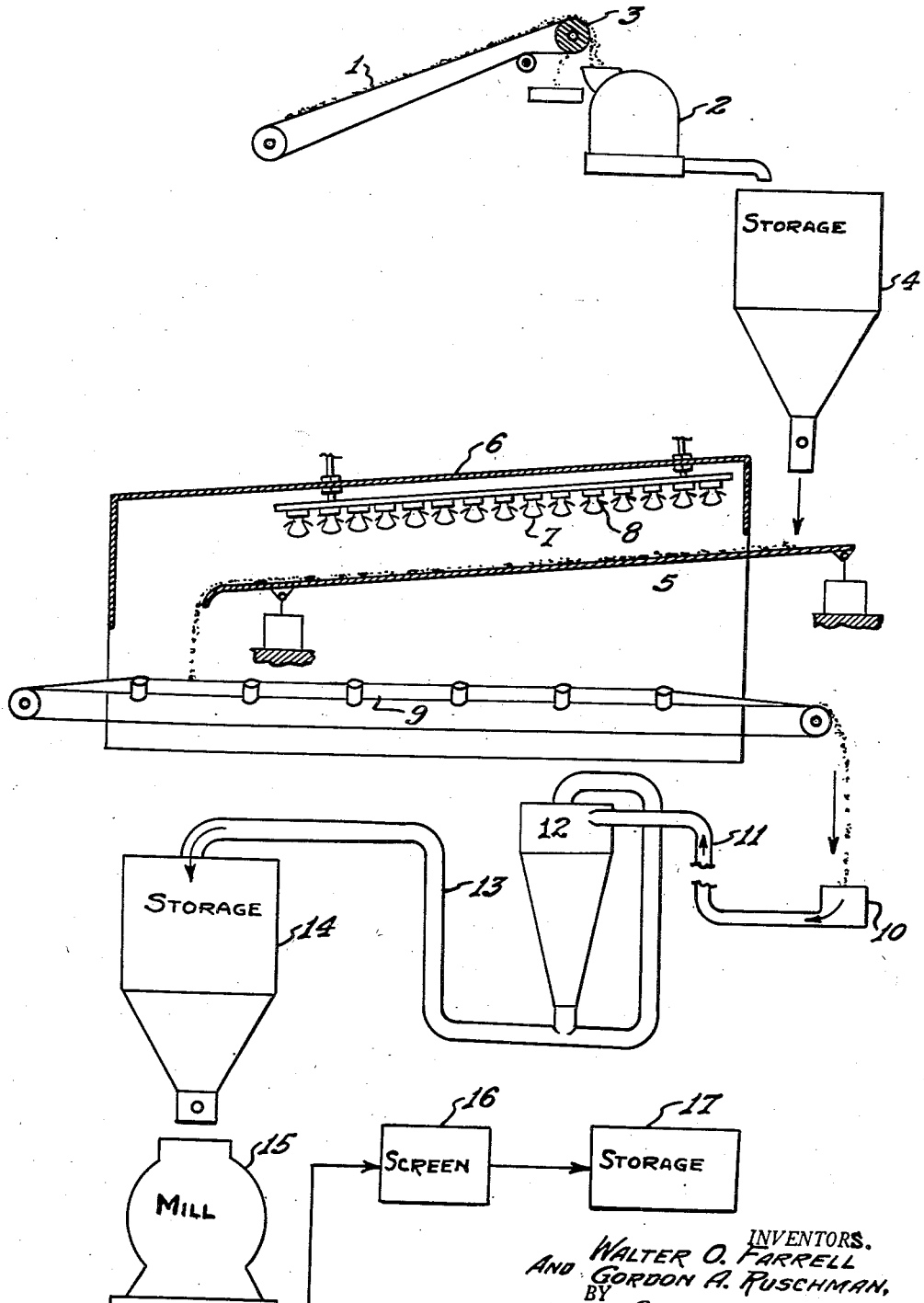

METHOD FOR HARD RUBBER DUST PRODUCTION

Walter O. Farrell, Wheaton, and Gordon A. Ruschman, River Forest, Ill., assignors to The Richardson Company, Cincinnati, Ohio, a corporation of Ohio Application April 16, 1952, Serial No. 282,622

12 Claims. (Cl. 260—775)

This application has to do with the formation of hard rubber dust. It is well known that hard rubber dust is a vitally important ingredient in the formation of curing stocks from which hard rubber molded articles are made, the dust as a filler exerting a substantial effect on the properties of the completed molded and cured article. Hard rubber dust for this purpose is an article of commerce; but in a factory operation for the large-scale production of hard rubber molded articles, there are various sources of material from which hard rubber dust may be produced; and economically the production of the dust should occur in the plant producing the sources of material. These various sources may be summarized as consisting for the most part of (a) substandard uncured stocks, (b) waste and the ends of uncured stock sheets from the cutting and handling processes, (c) semi-cured flash and overflow from molds, (d) semi-cured molded pieces from unsuccessful or incomplete molding operations, and (e) fully cured rejected molding pieces. Before these various classes of scrap can be ground into hard rubber dust, any uncured or semi-cured materials must be cured to a reasonably uniform hardness.

The primary object of this invention is the provision of means and a method for forming hard rubber dust useful as a filler in hard rubber curing stocks, which means and method will be rapid, inexpensive, capable of exact control, and free of the disadvantages of former methods. This primary object of the invention and ancillary objects, which will hereinafter be set forth or will be apparent to one skilled in the art upon reading these specifications, we accomplish by that procedure and apparatus of which we shall now describe an exemplary embodiment. Reference is made to the accompanying drawing which is a diagrammatic representation of an apparatus assembly suitable for our purpose.

Hitherto the formation of hard rubber dust has involved the collection of the various types of uncured and semi-cured scrap or other materials from which the dust is to be made and the placing of these materials in open work cages, usually formed of expanded metal. The loaded cages are placed in vulcanizers of the autoclave type and the materials are cured in an atmosphere of live steam at 80 pounds' to 100 pounds' pressure for four to four and one-half hours. At the conclusion of the curing cycle, the vulcanizer is "blown down" and opened; and the materials are permitted to cool. The cages may then be removed and unloaded in a position convenient to the feeder belt of dust grinding equipment.

There are a large number of disadvantages in such a procedure. Excessive manual labor is involved in the sorting, loading, charging and discharging of the vulcanizer. Also, the maintenance of the vulcanizer requires chipping and brushing once a week and painting with a protective paint every two weeks. Other maintenance costs arise from the necessity of packing the door, maintaining the steam lines and effecting repairs to the blowdown and condensate lines and sump. Considerable time is lost during the blow-down and the subsequent cooling of the vulcanizer and its contents before it can be unloaded; and, of course, there is a complete loss of steam and heat build-up after each cycle. Moreover, the capacities of the vulcanizers are small, and a considerable shrinkage in volume is noticeable after the curing of the materials.

A corrosive atmosphere is generated in the vulcanizer during curing. This contains hydrogen sulfide and sulfurous acid. These fumes corrode the expanded metal cages and the walls of the vulcanizer, giving rise to relatively large maintenance costs. The toxicity of the atmosphere generated during the curing is such as to make it hazardous to personnel loading and unloading the vulcanizers. Yet again, the blow-down of the vulcanizers is accomplished by flushing the exhausting lines with water. This water becomes contaminated with the constituents of the atmosphere and, if emptied into city sewage systems, gives off disagreeable odors which are a source of complaint.

While the odors may be eliminated by neutralizing equipment such as an iron ore sump, such equipment is expensive, takes up space and is difficult to maintain. Even without it, the vulcanizers, the sorting operations and the cages required take up a great deal of floor area. Corrosive conditions in the vulcanizers are such that the cages last only about four months.

In the practice of our invention we have found that all of these disadvantages may be eliminated and hard rubber dust formed directly and in a controlled manner at a very substantially lesser cost. Briefly, in the practice of our invention, stock suitable for the formation of hard rubber dust is comminuted to an intermediate size and then is passed on a suitable conveyor and in a thin layer under heating equipment which heats it sufficiently to start the vulcanization reaction. The heated material is then accumulated in a mass of sufficient size and thickness to minimize heat losses. Without further application of external heat, the vulcanization reaction then proceeds to the desired end point. The vulcanized material from the stack or accumulation is then rapidly cooled, and will be found to be in a condition suitable for storage preparatory to grinding and sizing for its ultimate use. The nature and source of the curing stocks employed in our invention do not constitute a limitation on it. The stocks may be derived from the sources mentioned above or from other sources including the special preparation of stocks designed for the sole purpose of being converted into hard rubber dust filler, as where such a product is to be manufactured and sold as such. Similarly, the chemical nature of the curing stocks is not a limitation on our invention, excepting to the extent that these stocks will contain natural or synthetic rubber hydrocarbon or rubber-like substances capable of vulcanization together with sufficient sulfur as a vulcanizing agent to give a suitably hard composition for the use intended. The stocks may or may not contain other filler substances, accelerators, plasticizers, hydrocarbon diluents and the like. If the stocks are uncured or semi-cured scrap materials from a molding operation, some or all of these substances will normally be present. Our procedure is applicable to uncured and semi-cured stock; and the inclusion of comminuted cured materials does not interfere with the processing. However, where the scrap materials are derived from plant scale molding operations, it will be usual to handle separately the fully cured materials such as broken or defective but fully cured molded articles, since materials so derived do not require vulcanization and can be added to materials vulcanized in accordance with our teachings at a later stage.

The materials to be converted into hard rubber dust are culled and collected in the usual manner. As indicated, they may consist in or comprise stocks especially made for the purpose, substandard batches of green stock or contaminated floor sweepings and end cuts derived from the mill room of a molding plant or semi-cured flash and overflow as well as semi-cured molded parts derived from the press room of a molding plant. Any or all of these materials are preferably ground to an intermediate particle size. We have found that a rotary knife type grinder having a ¼-in. screen, and hand fed, is adequate to produce the desired particle size at a rate of, say, 1500 to 1600 pounds per hour. In production operations we employ conveying equipment of the bucket or flight type, as indicated at 1 in the drawing, to feed the grinder 2. The conveying equipment is preferably provided with a magnet bank or a magnetic sheave 3 for the removal of tramp metal. The curing stock is fed into the grinder 2 while any metal pieces are separately collected and disposed of.

From the grinder 2 the material is preferably blown or conveyed to a storage hopper 4 of a suitable size and volumetric capacity. A primary purpose of the storage hopper is the collection of a sufficient quantity of the comminuted curing stock to permit continuous operation of the vulcanizing equipment next to be described in spite of intermittent operation of the grinder 2.

The comminuted material is next subjected to heat in a thin layer and on a suitable conveyor. To this end the storage hopper 4 is preferably equipped with a rotary valve to meter and spread the material on the conveyor, and with a gate shut-off.

The conveyor to which reference has been made is shown at 5 in the drawing. It is located within or below an oven or housing structure 6, open to the atmosphere and equipped with means whereby heat may be imparted to the relatively thin layer of curing stock particles on the conveyor. The heat may be applied in various ways by various means. Preferably, we employ radiant means, and of these, standard infra-red bulbs having internal reflectors have been found most convenient. A bank of these bulbs is indicated at 7, and they are usually provided with gold plated reflectors 8 to provide maximum radiation.

The conveyor 5 is preferably, though not necessarily, a vibrating conveyor of standard type. The shaker type of conveyor is preferred by us because it has a tendency to distribute the larger particles of the curing stock on the top of the layer of material on the conveyor. Such particles are normally the least cured particles of the stock being treated. Hence, they are the hardest to cure; and positioning them on the top of the traveling layer of material results in subjecting them to greater heat intensity. Additional stirring of the stock on the conveyor may be accomplished by dividing the conveyor into several sections, one section feeding the next cascade-wise or by equipping the conveyor with plow blades to churn or turn the stock, as may be found desirable.

In a particular installation we have employed a trough-type vibrating conveyor 65 in. wide and 17½ ft. long over which the material traveled in a layer ⅜ in. deep. These dimensions are exemplary and not limiting; but in the particular installation their operation resulted in subjecting the material to heat for a period of time of approximately 7 minutes.

The primary function of the heating means above described is to raise the comminuted stock to curing temperature. This temperature is normally about 350° to 375° F. The relative thinness of the layer on the conveyor and the constant moving of particles serves to insure that all particles will be raised to the desired temperature before they reach the end of the conveyor. As the next step in our process, we collect the heated particles in a relatively large mass from which heat dissipation by radiation and conduction is relatively slow. Vulcanization is an exothermic reaction; and we have found that when the heated particles are banked as described, vulcanization continues, and the stock may be cured to any point desired without the addition of further heat from external sources.

In initially heating the divided stock on the conveyor 5, the heating means, such as the infra-red bulbs 7, are preferably arranged to provide a temperature gradient throughout the length of the conveyor. This can be accomplished in several ways, as by employing different sizes of bulbs, varying the distances of the bulbs from the conveyor, or using a rheostat or other impedance to control the intensity of radiation. We have found it desirable to hold the initial 5 minutes of heating to an intensity of approximately 1250 watts per square foot of radiated surface. The balance of the heating cycle (whatever its length) may be limited to an intensity which is approximately two-thirds of that given above. Where a shaker type of conveyor is employed, it is important to isolate the oven mechanically since a transmission of vibrations to the bulbs through the oven structure will be found detrimental to their life. The oven 6 should also be well ventilated since oily fumes are given off by the comminuted heated stock during the heating and vulcanizing. These fumes are, however, such as may be readily vented to the atmosphere outside the factory building without producing an unpleasant or dangerous condition. Fluid movement means for venting the oven have not been illustrated, but can readily be provided by the skilled worker.

The degree of cure effected on the conveyor 5 is subject to wide variation. As has been indicated, it is advisable uniformly to heat the particles to a temperature of 350° to 375° F.; but considerations of economy, evolution and disposal of fumes and the like can be allowed to govern the length of the heating cycle.

In a batch operation the material could simply be accumulated or banked off the end of the conveyor 5, or held in suitable, relatively large containers for the completion of the vulcanization period. However, we prefer to have a continuous operation; and in such an operation a slow moving, trough-like conveyor, such as the conveyor 9, will be found advisable. In the particular operation employing the vibrator-conveyor mentioned above, we have used for the element 9 a trough-like asbestos belt, 3-ft. wide and moving at a rate of approximately .4 ft. per minute. With this particular equipment the heated particles were accumulated on the conveyor 9 in a relatively large mass from which heat dissipation was slow, the vulcanization time on the conveyor being of the order of 15 to 20 minutes, during which time the comminuted material was, of course, not subject to stirring or agitation.

As shown in the drawing, we prefer to locate the curing belt 9 beneath the oven 6 and beneath the vibrator-conveyor 5. This not only conserves floor space, but utilizes such heat as may be radiated from the banked particles. For example, heat radiated against the bottom of the vibrator-conveyor 5 is useful in heating up the particles thereon. Both conveyors are essentially open to the atmosphere.

The speed of travel of the conveyor 9 is controllable. By controlling the feeding speed of conveyor 5 and the speed of travel of conveyor 9, we can control the thickness of the banked layer on the latter conveyor and also the length of time consumed in the vulcanizing cycle as distinguished from the heating cycle. In this way the degree of cure of the stock may be exactly regulated.

The cured stock coming off the conveyor 9 by reason of its relatively high heat may be so soft as to have a tendency to agglomerate in a storage hopper, and may be too soft to be ground conveniently. It should, therefore, normally be cooled to approximately 125 to 130° F. or lower before being fed to grinding equipment; and a rapid cooling is preferable as a safeguard against overcure. Cooling may be accomplished in various ways; but we have found that the most feasible and cheapest method involves cooling by air as an incident to the conveying of the material to storage. In the drawing we have shown the material falling off the end of the conveyor 9 into the hopper of an air conveying apparatus comprising a venturi-type tube, wherein the comminuted material is rapidly entrained in a relatively large volume of moving air. Additional air may be introduced by means of fans, and the material may be blown to roof height through a conduit 11 and delivered to a cyclone 12. The primary purpose of the cyclone is to effect further rapid cooling rather than separation; and it will be noted in the drawing that both the air and solid materials outlets of the cyclone are connected to a conduit 13 by which the material may be delivered to a suitable storage bin 14. During the conveying of vulcanized material or in the storage bin 14, increments of comminuted vulcanized scrap may be added to it. The vulcanized scrap will, of course, ordinarily be derived from an inspection room and will consist of blown or defective but fully vulcanized hard rubber articles. However, additional quantities of hard rubber scrap derived from other sources may be used. The storage bin 14 will have a size appropriate to the collection of a sufficient quantity of the comminuted vulcanized hard rubber to permit efficient operation of a grinding department. The grinding operation is indicated in our drawing only diagrammatically as comprising a mill 15, screening means 16 and a storage hopper or bin 17. Normally, grinding is conducted in several stages. The storage bin 14 may be equipped with a vibratory feeding device to feed a hammer mill. The output of the hammer mill may be air conveyed to a cyclone separator and dropped into an attrition mill. The hammer and attrition mills will be of conventional types. From the attrition mill the material may be sent through a screening device separating it into various components, some of which may be returned to one or both mills for further grinding, the finest component being then air separated and delivered to the storage 17 for the final product. The specific nature of the grinding and sizing operations does not form a limitation on the invention.

It will be seen that we have successfully produced a high grade of hard rubber dust with comparatively little mechanism, continuously and cheaply but with exact and accurate control. It will also be apparent that we have eliminated the disadvantages of the hitherto current methods of producing hard rubber dust from uncured or semi-cured scrap stocks.

Modifications may be made in our invention without departing from the spirit of it. Having thus described our invention in an exemplary embodiment, what we claim as new and desire to secure by Letters Patent is:

1. A process of making a hard rubber dust which comprises providing a vulcanizable hard rubber stock, comminuting it, exposing it in a relatively thin layer of comminuted particles to a source of heat to raise the particles to vulcanizing temperature to start an exothermic vulcanization reaction, collecting the heated particles while still in heated condition and in the process of vulcanization in a mass of relatively greater dimensions in which heat dissipation is retarded and allowing the particles in the said mass to continue the vulcanization reaction, the heat generated during such continuation of the vulcanization serving to maintain a vulcanizing temperature.

2. The process claimed in claim 1, wherein the heat applied to the comminuted stock while in a thin layer is radiant heat.

3. The process claimed in claim 1, wherein the heat applied to the comminuted stock while in a thin layer is radiant heat, and wherein the comminuted stock being heated is caused to travel in a thin layer on a conveyor adjacent radiant heating means.

4. The process claimed in claim 1, wherein the heat applied to the comminuted stock while in a thin layer is radiant heat, and wherein the comminuted stock being heated is caused to travel in a thin layer on a conveyor adjacent radiant heating means, the radiant heating means comprising a bank of infra-red sources.

5. The process claimed in claim 1, wherein the heat applied to the comminuted stock while in a thin layer is radiant heat, and wherein the comminuted stock being heated is caused to travel in a thin layer on a conveyor adjacent radiant heating means, the radiant heating means comprising a bank of infra-red sources, the method including the step of arranging said sources to provide a temperature gradient with respect to said conveyor.

6. The process claimed in claim 1, wherein the application of heat to the comminuted stock in a thin layer is accomplished while the said particles are moving on a conveyor under the influence of a heating means, and wherein the collection of the heated particles of comminuted stock into a mass of larger dimensions is accomplished by feeding the said stock from the said conveyor onto a second conveyor traveling at a lesser speed.

7. A process of producing a hard rubber dust for filler purposes which comprises providing a hard rubber vulcanizing stock, comminuting said stock to a size not substantially larger than approximately ¼ in. mesh, heating the comminuted stock in a thin layer to raise the particles thereof to a temperature of substantially 350° to 375° F. and collecting the heated particles in a mass of substantial dimensions such as to diminish heat losses therefrom and permitting vulcanization to continue under the heat generated in the mass by the vulcanization reaction.

8. The process claimed in claim 7, wherein the heating cycle is of the order of minutes in length and the subsequent vulcanization cycle in the adjacent mass is of the order of at least three times as long in duration as the heating cycle.

9. A process of producing a hard rubber dust for filler purposes which comprises providing a hard rubber vulcanizing stock, comminuting said stock to a size not substantially larger than approximately ¼ in. mesh, heating the comminuted stock in a thin layer to raise the particles thereof to a temperature of substantially 350° to 375° F. and collecting the heated particles in a mass of substantial dimensions such as to diminish heat losses therefrom and permitting vulcanization to continue under the heat generated in the mass by the vulcanization reaction, and rapidly cooling the vulcanized comminuted stock.

10. A process of producing a hard rubber dust for filler purposes which comprises providing a hard rubber vulcanizing stock, comminuting said stock to a size not substantially larger than approximately ¼ in. mesh, heating the comminuted stock in a thin layer to raise the particles thereof to a temperature of substantially 350° to 375° F. and collecting the heated particles in a mass of substantial dimensions such as to diminish heat losses therefrom and permitting vulcanization to continue under the heat generated in the mass by the vulcanization reaction, and rapidly cooling the vulcanized comminuted stock, by entraining it in rapidly moving air and conveying it to storage.

11. A process of producing hard rubber dust for filler purposes which comprises providing a rubber stock vulcanizable to hard rubber, comminuting the said stock, uniformly heating the comminuted stock in a thin layer to vulcanization temperature, collecting the heated stock in a mass of larger dimensions with reduced heat loss, allowing the vulcanization reaction to proceed while heat is maintained by the exothermic nature of the vulcanization reaction and separating and rapidly cooling the vulcanized particles of the said mass.

12. A process of producing hard rubber dust which comprises comminuting incompletely vulcanized hard rubber stock, continuously vulcanizing the said stock while moving it on conveying means, rapidly cooling the said comminuted and vulcanized stock and grinding the comminuted vulcanized stock to a size suitable for use as a filler.

(References on following page)

References Cited in the file of this patent

UNITED STATES PATENTS

| | | |
|---|---|---|
| 939,936 | Wilfley | Nov. 9, 1909 |
| 1,755,016 | Murphy | Apr. 15, 1930 |
| 1,871,038 | Cadwell | Aug. 9, 1932 |
| 1,967,809 | Chittenden | July 24, 1934 |
| 2,139,067 | Boax | Dec. 6, 1938 |
| 2,200,735 | Battin | May 14, 1940 |
| 2,289,354 | Gardner | July 14, 1942 |
| 2,419,876 | Birdseye | Apr. 29, 1947 |
| 2,458,351 | Cukierski | Jan. 4, 1949 |
| 2,575,426 | Parnell | Nov. 20, 1951 |